United States Patent
Mahato et al.

(10) Patent No.: US 12,182,815 B2
(45) Date of Patent: Dec. 31, 2024

(54) SYSTEM AND COMPUTER IMPLEMENTED METHOD FOR GENERATING AND TRANSMITTING TOKENIZED CARD INFORMATION

(71) Applicant: Visa International Service Association, San Francisco, CA (US)

(72) Inventors: Kaushik Kumar Mahato, Jamshedpur (IN); Prateek Narendra, Stony Brook, NY (US)

(73) Assignee: Visa International Service Association, San Francisco, CA (US)

( * ) Notice: Subject to any disclaimer, the term of this patent is extended or adjusted under 35 U.S.C. 154(b) by 268 days.

(21) Appl. No.: 17/774,493

(22) PCT Filed: Nov. 13, 2019

(86) PCT No.: PCT/US2019/061164
§ 371 (c)(1),
(2) Date: May 5, 2022

(87) PCT Pub. No.: WO2021/096498
PCT Pub. Date: May 20, 2021

(65) Prior Publication Data
US 2022/0374899 A1 Nov. 24, 2022

(51) Int. Cl.
*G06Q 20/40* (2012.01)
*G06Q 20/10* (2012.01)
*G06Q 20/38* (2012.01)

(52) U.S. Cl.
CPC ....... *G06Q 20/4014* (2013.01); *G06Q 20/105* (2013.01); *G06Q 20/389* (2013.01)

(58) Field of Classification Search
CPC ............ G06Q 20/4014; G06Q 20/105; G06Q 20/389; H04L 9/0822; H04L 9/3226; H04L 2209/56
See application file for complete search history.

(56) References Cited

U.S. PATENT DOCUMENTS

| | | | |
|---|---|---|---|
| 9,697,518 B2 * | 7/2017 | Mattsson | G06Q 20/322 |
| 2002/0178370 A1 * | 11/2002 | Gurevich | G06F 21/34 |
| | | | 713/184 |

(Continued)

*Primary Examiner* — Patrick McAtee
*Assistant Examiner* — Vincent I Idiake
(74) *Attorney, Agent, or Firm* — The Webb Law Firm

(57) ABSTRACT

The present disclosure relates to a method and a tokenization server for generating and transmitting tokenized card information to a token requestor. In some non-limiting embodiments or aspects, the method includes receiving, from the token requestor, a request for a token corresponding to a payment card. The token may include a plurality of characters. Further, the method includes generating a token key corresponding to the token based on location information associated with a plurality of files stored in a user device. Subsequently, the method includes transmitting the token key, including location information within the plurality of files in the user device, to the token requestor. Here, the location information may include a location embedded with a character of the plurality of characters of the token. Thus, the present disclosure provides a secure method of generating, storing, and transmitting the tokenized card information.

16 Claims, 4 Drawing Sheets

(56) References Cited

U.S. PATENT DOCUMENTS

2013/0132215 A1* 5/2013 Mutha .............. G06Q 20/40975
  705/16
2016/0381023 A1 12/2016 Dulce et al.
2018/0189502 A1 7/2018 Kumar et al.
2019/0318345 A1* 10/2019 Kallugudde ......... G06Q 20/351

* cited by examiner

SYSTEM AND COMPUTER IMPLEMENTED METHOD FOR GENERATING AND TRANSMITTING TOKENIZED CARD INFORMATION

CROSS-REFERENCE TO RELATED APPLICATION

This application is the United States national phase of International Application No. PCT/US2019/061164 filed Nov. 13, 2019, the entire disclosure of which is hereby incorporated by reference in its entirety.

BACKGROUND

1. Technical Field

The present disclosure relates to tokenized cards. Particularly, but not exclusively, the present disclosure relates to a system and a computer implemented method for generating and transmitting tokenized card information in a secure way.

2. Technical Considerations

Tokenization of cards is a technique in which a unique token is used for masking sensitive card details like a primary account number (PAN) associated with the card, original card number, security codes, and identifiers. After tokenization, the token corresponding to the card is used in lieu of actual card details for performing transactions or related actions.

Presently, the tokenization process is carried out through entities called token requestors, in which a customer and/or a user of the card intends to make a transaction. In this scenario, essentially, the user has to share sensitive details such as account number, card details, and security codes with the token requestor to allow the token requestor to obtain a token corresponding to the card. Consequently, the sensitive user information is subjected to security risks at the token requestor's end and/or at intermediate channels connecting the user to the token requestors.

Therefore, there exists a need for a secure method for generating, storing, and sharing the tokenized card information.

The information disclosed in this background of the disclosure section is only for enhancement of understanding of the general background of the disclosure and should not be taken as an acknowledgement or any form of suggestion that this information forms the prior art already known to a person skilled in the art.

SUMMARY

Additional features and advantages are realized through the techniques of the present disclosure. Other embodiments and aspects of the disclosure are described in detail herein and are considered a part of the claimed disclosure.

In some non-limiting embodiments or aspects, provided is computer-implemented method comprising: receiving, with at least one processor and from a token requestor, a request for a token corresponding to a payment card, wherein the token comprises a plurality of characters; and transmitting, with at least one processor and to the token requestor, a token key corresponding to the token, wherein the token key comprises location information within a plurality of files in a user device, and wherein the location information comprises a location embedded with a character of the plurality of characters of the token.

In some non-limiting embodiments or aspects, in response to receiving a transaction initiation request or an authentication request from a user, the method further comprises generating, by the token requestor, the request. In some non-limiting embodiments or aspects, the request comprises information related to at least one of the following: a user of the payment card, the user device associated with the user, an authentication pin, or any combination thereof. In some non-limiting embodiments or aspects, the method further comprises encrypting, with at least one processor, the token key using an authentication pin before transmitting the token key to the token requestor, wherein the token key is decrypted by the token requestor, using the authentication pin, for extracting the token corresponding to the payment card. In some non-limiting embodiments or aspects, generating the token key for the token comprises: receiving, with at least one processor, the plurality of files from the user device; identifying, with at least one processor, one or more locations in the plurality of files with the plurality of characters of the token embedded; and generating, with at least one processor, the location information by associating the one or more identified locations with a corresponding plurality of characters of the token. In some non-limiting embodiments or aspects, the method further comprises generating, with at least one processor, a new token key at predetermined periodic intervals or upon detecting a change in the location information. In some non-limiting embodiments or aspects, the token is previously generated and stored in a tokenization server or generated by a tokenization server in real-time.

In some non-limiting embodiments or aspects, provided is a tokenization server comprising: at least one processor; and a memory, communicatively coupled to the at least one processor, wherein the memory stores processor-executable instructions, which, on execution, cause the processor to: receive, from a token requestor, a request for a token corresponding to a payment card, wherein the token comprises a plurality of characters; and transmit, to the token requestor, a token key corresponding to the token, wherein the token key comprises location information within a plurality of files in a user device, wherein the location information comprises a location embedded with a character of the plurality of characters of the token.

In some non-limiting embodiments or aspects, the request is generated by the token requestor in response to receiving a transaction initiation request or an authentication request from a user. In some non-limiting embodiments or aspects, the request comprises information related to at least one of the following: a user of the payment card, the user device associated with the user, an authentication pin, or any combination thereof. In some non-limiting embodiments or aspects, the at least one processor encrypts the token key using an authentication pin before transmitting the token key to the token requestor. In some non-limiting embodiments or aspects, the at least one processor generates the token key for the token by: receiving the plurality of files from the user device; identifying one or more locations in the plurality of files with the plurality of characters of the token embedded; and generating the location information by associating the one or more identified locations with corresponding plurality of characters of the token. In some non-limiting embodiments or aspects, the at least one processor generates a new token key at predetermined periodic intervals or upon detecting a change in the location information. In some non-limiting embodiments or aspects, the token key is decrypted by the token requestor, using an authentication pin, for extracting the token corresponding to the payment card.

In some non-limiting embodiments or aspects, provided is a non-transitory computer-readable medium including instructions stored thereon that, when processed by at least one processor, cause the at least one processor to perform operations comprising: receiving, from a token requestor, a request for a token corresponding to a payment card, wherein the token comprises a plurality of characters; and transmitting, to the token requestor, a token key corresponding to the token, wherein the token key comprises location information within a plurality of files in a user device, wherein the location information comprises a location embedded with a character of the plurality of characters of the token.

In some non-limiting embodiments or aspects, the request is generated by the token requestor in response to receiving a transaction initiation request or an authentication request from a user, wherein the request comprises information related to at least one of the following: a user of the payment card, the user device associated with the user, an authentication pin, or any combination thereof. In some non-limiting embodiments or aspects, the instructions cause the at least one processor to encrypt the token key using an authentication pin before transmitting the token key to the token requestor, wherein the token key is decrypted by the token requestor, using the authentication pin, for extracting the token corresponding to the payment card. In some non-limiting embodiments or aspects, the instructions cause the at least one processor to generate the token key for the token by: receiving the plurality of files from the user device; identifying one or more locations in the plurality of files with the plurality of characters of the token embedded; and generating the location information by associating the one or more identified locations with corresponding plurality of characters of the token. In some non-limiting embodiments or aspects, the instructions cause the at least one processor to generate a new token key at predetermined periodic intervals or upon detecting a change in the location information. In some non-limiting embodiments or aspects, the token is previously generated and stored in a tokenization server or generated by a tokenization server in real-time.

Further non-limiting embodiments or aspects are set forth in the following numbered clauses.

Clause 1: A computer-implemented method comprising: receiving, with at least one processor and from a token requestor, a request for a token corresponding to a payment card, wherein the token comprises a plurality of characters; and transmitting, with at least one processor and to the token requestor, a token key corresponding to the token, wherein the token key comprises location information within a plurality of files in a user device, and wherein the location information comprises a location embedded with a character of the plurality of characters of the token.

Clause 2: The computer-implemented method of clause 1, wherein, in response to receiving a transaction initiation request or an authentication request from a user, the method further comprises generating, by the token requestor, the request.

Clause 3: The computer-implemented method of clause 1 or 2, wherein the request comprises information related to at least one of the following: a user of the payment card, the user device associated with the user, an authentication pin, or any combination thereof.

Clause 4: The computer-implemented method of any of clauses 1-3, further comprising encrypting, with at least one processor, the token key using an authentication pin before transmitting the token key to the token requestor, wherein the token key is decrypted by the token requestor, using the authentication pin, for extracting the token corresponding to the payment card.

Clause 5: The computer-implemented method of any of clauses 1-4, wherein generating the token key for the token comprises: receiving, with at least one processor, the plurality of files from the user device; identifying, with at least one processor, one or more locations in the plurality of files with the plurality of characters of the token embedded; and generating, with at least one processor, the location information by associating the one or more identified locations with a corresponding plurality of characters of the token.

Clause 6: The computer-implemented method of any of clauses 1-5, further comprising generating, with at least one processor, a new token key at predetermined periodic intervals or upon detecting a change in the location information.

Clause 7: The computer-implemented method of any of clauses 1-6, wherein the token is previously generated and stored in a tokenization server or generated by a tokenization server in real-time.

Clause 8: A tokenization server comprising: at least one processor; and a memory, communicatively coupled to the at least one processor, wherein the memory stores processor-executable instructions, which, on execution, cause the processor to: receive, from a token requestor, a request for a token corresponding to a payment card, wherein the token comprises a plurality of characters; and transmit, to the token requestor, a token key corresponding to the token, wherein the token key comprises location information within a plurality of files in a user device, and wherein the location information comprises a location embedded with a character of the plurality of characters of the token.

Clause 9: The tokenization server of clause 8, wherein the request is generated by the token requestor in response to receiving a transaction initiation request or an authentication request from a user.

Clause 10: The tokenization server of clause 8 or 9, wherein the request comprises information related to at least one of the following: a user of the payment card, the user device associated with the user, an authentication pin, or any combination thereof.

Clause 11: The tokenization server of any of clauses 8-10, wherein the at least one processor encrypts the token key using an authentication pin before transmitting the token key to the token requestor.

Clause 12: The tokenization server of any of clauses 8-11, wherein the at least one processor generates the token key for the token by: receiving the plurality of files from the user device; identifying one or more locations in the plurality of files with the plurality of characters of the token embedded; and generating the location information by associating the one or more identified locations with corresponding plurality of characters of the token.

Clause 13: The tokenization server of any of clauses 8-12, wherein the at least one processor generates a new token key at predetermined periodic intervals or upon detecting a change in the location information.

Clause 14: The tokenization server of any of clauses 8-13, wherein the token key is decrypted by the token requestor, using an authentication pin, for extracting the token corresponding to the payment card.

Clause 15: A non-transitory computer-readable medium including instructions stored thereon that, when processed by at least one processor, cause the at least one processor to perform operations comprising: receiving, from a token requestor, a request for a token corresponding to a payment card, wherein the token comprises a plurality of characters; and transmitting, to the token requestor, a token key corresponding to the token, wherein the token key comprises location information within a plurality of files in a user device, and wherein the location information comprises a location embedded with a character of the plurality of characters of the token.

Clause 16: The medium of clause 15, wherein the request is generated by the token requestor in response to receiving a transaction initiation request or an authentication request from a user, wherein the request comprises information related to at least one of the following: a user of the payment card, the user device associated with the user, an authentication pin, or any combination thereof.

Clause 17: The medium of clause 15 or 16, wherein the instructions cause the at least one processor to encrypt the token key using an authentication pin before transmitting the token key to the token requestor, and wherein the token key is decrypted by the token requestor, using the authentication pin, for extracting the token corresponding to the payment card.

Clause 18: The medium of any of clauses 15-17, wherein the instructions cause the at least one processor to generate the token key for the token by: receiving the plurality of files from the user device; identifying one or more locations in the plurality of files with the plurality of characters of the token embedded; and generating the location information by associating the one or more identified locations with corresponding plurality of characters of the token.

Clause 19: The medium of any of clauses 15-18, wherein the instructions cause the at least one processor to generate a new token key at predetermined periodic intervals or upon detecting a change in the location information.

Clause 20: The medium of any of clauses 15-19, wherein the token is previously generated and stored in a tokenization server or generated by a tokenization server in real-time.

In some non-limiting embodiments or aspects, the present disclosure may include a computer-implemented method that may include, receiving, from a token requestor, a request for a token corresponding to a payment card. The token may comprise a plurality of characters. Further, the method may include transmitting, to the token requestor, a token key corresponding to the token. The token key may comprise location information within a plurality of files in a user device. The location information may comprise a location embedded with a character of the plurality of characters of the token.

Further, in some non-limiting embodiments or aspects, the present disclosure may include a tokenization server. The tokenization server may include a processor and a memory. The memory may be communicatively coupled to the processor and may store processor-executable instructions, which, on execution, cause the processor to receive, from a token requestor, a request for a token corresponding to a payment card. The token may comprise a plurality of characters. Further, the instructions may cause the processor to transmit, to the token requestor, a token key corresponding to the token. The token key may comprise location information within a plurality of files in a user device. The location information may comprise a location embedded with a character of the plurality of characters of the token.

Furthermore, in some non-limiting embodiments or aspects, the present disclosure may include a non-transitory computer readable medium including instructions stored thereon that when processed by at least one processor causes a device to perform operations including receiving, from a token requestor, a request for a token corresponding to a payment card. The token may comprise a plurality of characters. Further, the processor may cause the device to transmit, to the token requestor, a token key corresponding to the token. The token key may comprise location information within a plurality of files in a user device. The location information may comprise a location embedded with a character of the plurality of characters of the token.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
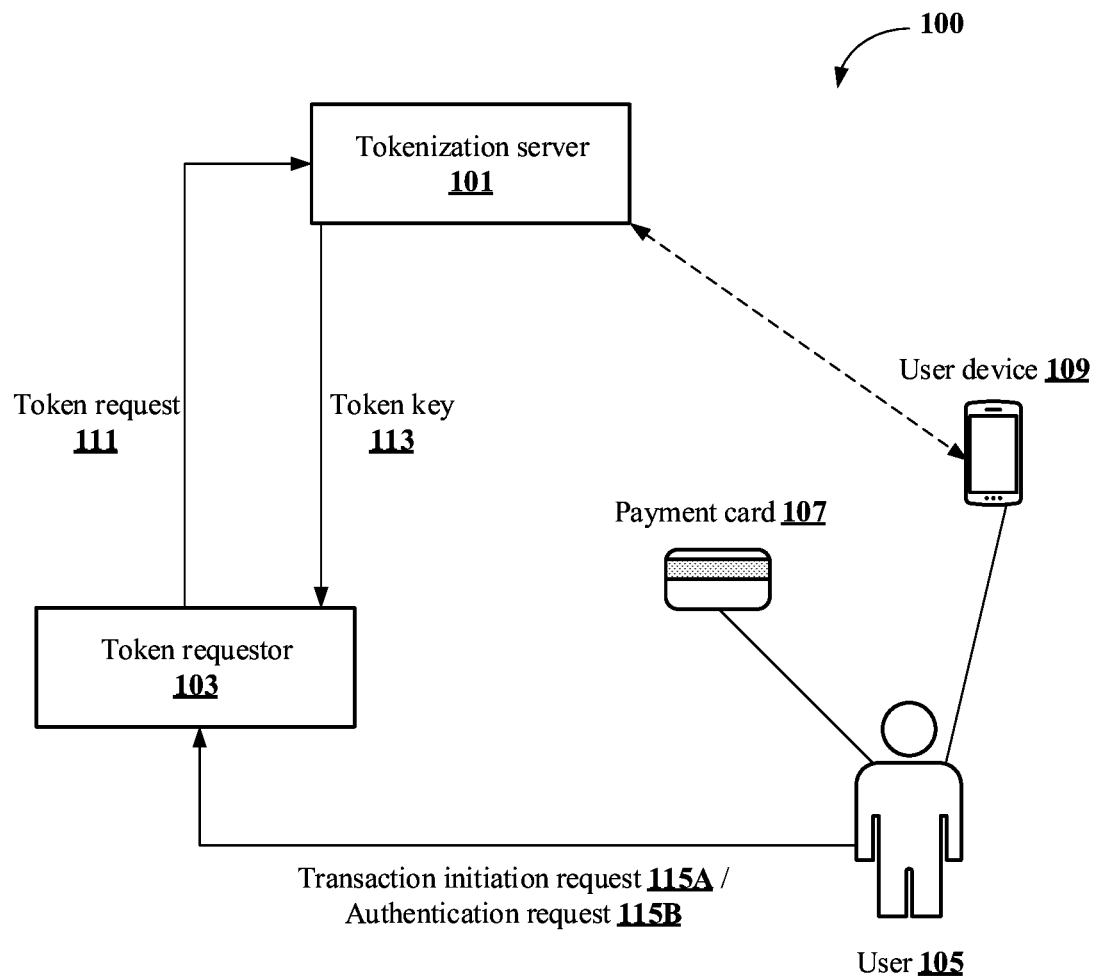
FIG. 1 shows an exemplary environment illustrating a method of generating and transmitting tokenized card information in accordance with some non-limiting embodiments or aspects of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer-readable medium and executed by a computer or processor, whether such computer or processor is explicitly shown. While each of the figures illustrates a particular embodiment for purposes of illustrating a clear example, other embodiments may omit, add to, reorder, and/or modify any of the elements shown in the figures.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

In the following detailed description of the embodiments of the disclosure, reference is made to the accompanying drawings that form a part hereof, and in which are shown by way of illustration specific embodiments in which the disclosure may be practiced. It should be understood, however, that it is not intended to limit the disclosure to the forms disclosed, but on the contrary, the disclosure is to cover all modifications, equivalents, and alternatives falling within the spirit and the scope of the disclosure. It is to be understood that other embodiments may be utilized and that changes may be made without departing from the scope of the present disclosure. The following description is, therefore, not to be taken in a limiting sense.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" does not, without more constraints, preclude the existence of other elements or additional elements in the system or method.

The terms "includes", "including", or any other variations thereof are intended to cover a non-exclusive inclusion such that a setup, device, or method that includes a list of components or steps does not include only those components or steps but may include other components or steps not expressly listed or inherent to such setup, device, or method. In other words, one or more elements in a system or apparatus proceeded by "includes . . . a" does not, without more constraints, preclude the existence of other elements or additional elements in the system or method.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has", "have", "having", or the like are intended to be open-ended terms. Further, the phrase "based on" is intended to mean "based at least in partially on" unless explicitly stated otherwise. The term "some non-limiting embodiments or aspects" means "one or more (but not all) embodiments or aspects of the disclosure(s)" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

As used herein, the terms "communication", "communicate", "send", and/or "receive" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the terms "server" and/or "processor" may refer to one or more computing devices, such as processors, storage devices, and/or similar computer components that communicate with client devices and/or other computing devices over a network, such as the Internet or private networks, and, in some examples, facilitate communication among other servers and/or client devices. It will be appreciated that various other arrangements are possible. As used herein, the term "system" may refer to one or more computing devices or combinations of computing devices such as, but not limited to, processors, servers, client devices, software applications, and/or other like components. In addition, reference to "a server" or "a processor", as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

The present disclosure relates to a tokenization server and a computer implemented method for generating and transmitting tokenized card information. In some non-limiting embodiments or aspects, the method includes receiving, from a token requestor, a request for a token corresponding to a payment card. As an example, the token may be made up of a plurality of characters. Subsequent to receiving the request, the method includes generating a token key corresponding to the token based on location information associated with a plurality of files stored in a user device. In some non-limiting embodiments or aspects, the user device may be a computing device associated with the user of the payment card. Further, the method includes transmitting the token key, comprising location information within the plurality of files in the user device, to the token requestor. In some non-limiting embodiments or aspects, the location information may include a location embedded with a character of the plurality of characters of the token. Thus, in the present disclosure, the token key is represented using location information corresponding to a plurality of locations within the plurality of files, which store the characters of the token.

In some non-limiting embodiments or aspects, the tokenization server and the computer-implemented method of present disclosure provide a secure mechanism for storing the information of a tokenized card on a personal device of the user, instead of storing the information on any device located at the token requestors end. This also ensures that the tokenized card information is not directly shared to the token requestor over the Internet. Consequently, the present disclosure enhances the security associated with generating, storing, and transmitting the tokenized card information.

FIG. 1 shows an exemplary environment 100 illustrating a method of generating and transmitting tokenized card information in accordance with some non-limiting embodiments or aspects of the present disclosure. In some non-limiting embodiments or aspects, the environment 100 may include a tokenization server 101, a token requestor 103, and a user 105. In some non-limiting embodiments or aspects, the tokenization server 101 may be any server, processor, and/or computing device. In general, the tokenization server 101 may be a token service and/or a token issuer entity that may be configured to create, store, and manage tokens in a secure manner. In some non-limiting embodiments or aspects, the tokenization server 101 may dynamically generate a token corresponding to a payment card 107, upon receiving a request for the token from the token requestor 103.

In some non-limiting embodiments or aspects, the token requestor 103 may be an entity that requests the token for the payment card 107 of the user 105. As an example, the token requestor 103 may be, without limitation, a digital payment service provider including online retailers and mobile wallets. In general, the token requestor 103 may be an entity through which the user 105 may authenticate and/or carry out transactions using the payment card 107.

In some non-limiting embodiments or aspects, the user 105 may be a card holder (e.g., a user 105 of the payment card 107). The payment card 107 may be a debit card, credit card, and the like. Further, the user 105 may be associated with a user device 109. In some non-limiting embodiments or aspects, the user device 109 may include, without limitation, a smartphone, a personal digital assistant (PDA), a personal computer, laptop, and the like. In some non-limiting embodiments or aspects, the user 105 may store a plurality of files in the user device 109. As an example, the plurality of files may include, without limitation, text files, image files, audio/video files, and the like. In some non-limiting embodiments or aspects, during the process of generating a token key 113 corresponding to the token of the payment card 107, the tokenization server 101 may have access to the plurality of files stored in the user device 109.

In some non-limiting embodiments or aspects, whenever the user 105 wishes to perform one or more actions including, without limitation, an authentication of the payment card 107 and/or carrying out transactions using the payment card 107, the user 105 may transmit a transaction initiation request 115A or an authentication request 115B to the token requestor 103. In some non-limiting embodiments or aspects, the initiation request may be generated when the user 105 uses the payment card 107 in one of the modes including, without limitation, electronic-commerce, mobile-commerce, in-app transactions, and other modes of contact or contactless purchases. Once the initiation request is received from the user 105, the token requestor 103 may fetch or obtain information including, without limitation, information related to the user 105, information related to the user device 109, and information related to an authentication pin used by the user 105 (or any combination thereof). Subsequently, the token requestor 103 may transmit a request to the tokenization server 101 for obtaining a token corresponding to the payment card 107.

In some non-limiting embodiments or aspects, the token corresponding to the payment card 107 may be a unique representation comprising a plurality of characters, which may be used for masking the sensitive information related to the payment card 107. In some non-limiting embodiments or aspects, the token may include, without limitation, a combination of digits, alpha-numeric characters, and/or encoded characters that are encoded using any of the existing character encoding logics. As an example, the token may be used for masking the information such as, without limitation, a card number, a PAN corresponding to the payment card 107, security codes (for example, Card Verification Value (CVV)), and the like. As an example, a 16-digit card number may be masked with a 16-character token, such that each digit of the card number is replaced by a random character of the token, thereby masking the card number from unauthorized recipients.

In some non-limiting embodiments or aspects, upon receiving the request for the token (alternatively referred as a token request 111 in FIG. 1), the tokenization server 101 may generate and transmit a token key 113, corresponding to the token, to the token requestor 103. In some non-limiting embodiments or aspects, the tokenization server 101 may generate the token key 113 based on location information within the plurality of files in the user device 109. In some non-limiting embodiments or aspects, the location information includes a location embedded with a character of the plurality of characters of the token. In some non-limiting embodiments or aspects, the token key 113 may be the location information of the locations within the plurality of files, which represent and/or are embedded with each of the plurality of characters of the token. The process of generating the token key 113 is explained in detail in the subsequent sections of the disclosure.

In some non-limiting embodiments or aspects, once the token key 113 is generated, the tokenization server 101 may transmit the token key 113 to the token requestor 103. In some non-limiting embodiments or aspects, the tokenization server 101 may encrypt the token key 113 before transmitting the token key 113 to the token requestor 103 in order to ensure that the token key 113 is transmitted to the token requestor 103 in a secure manner. Subsequently, the token requestor 103 may decrypt the token key 113 using the authentication pin received from the user 105 to retrieve and/or extract the token from the token key 113. Thereafter, the token requestor 103 may use the extracted token for performing the one or more actions requested by the user 105. As an example, upon extracting the token, the token requestor 103 may authenticate the payment card 107 and/or carry out transactions using the payment card 107.

Figure 2:
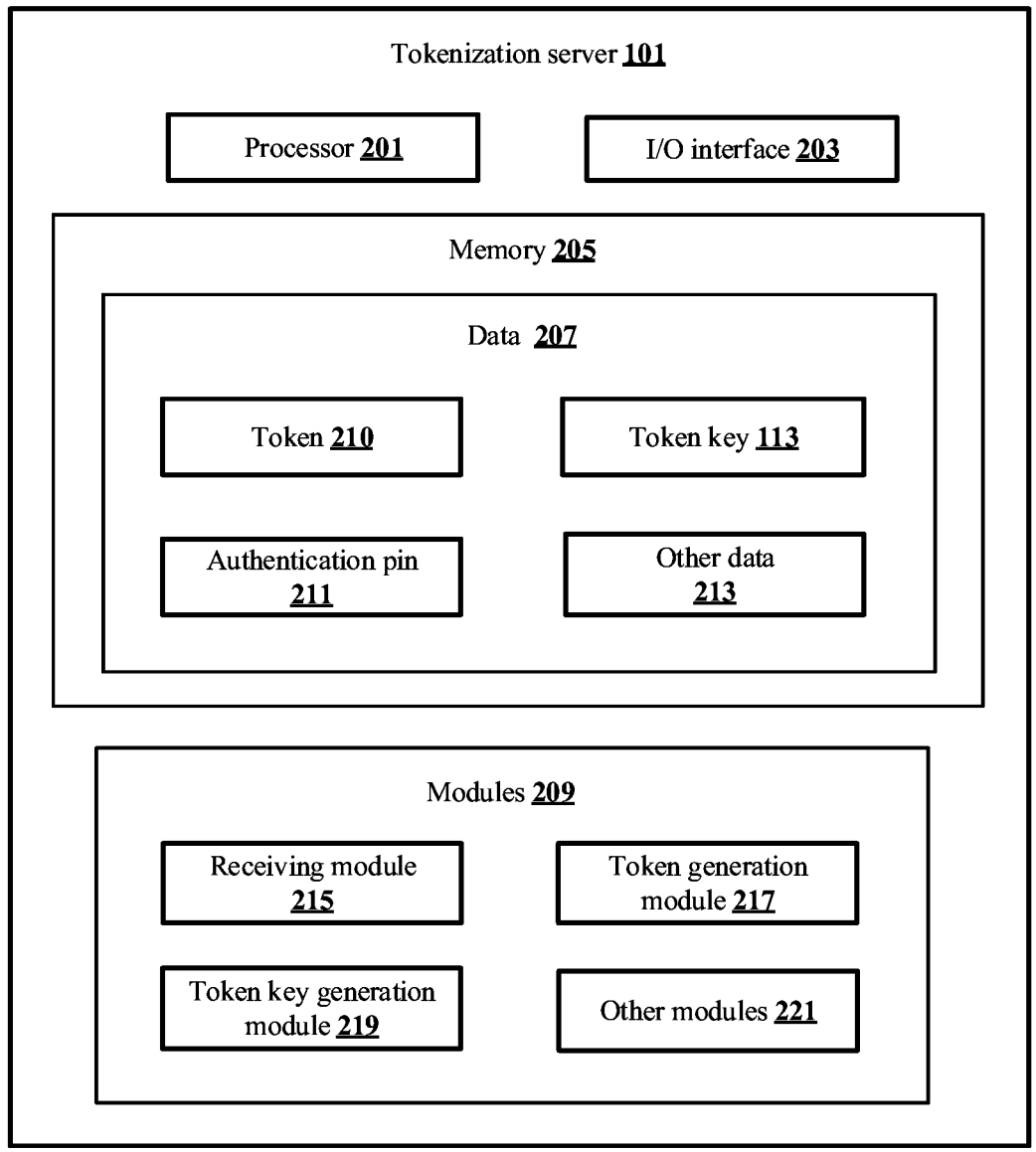
FIG. 2 shows a detailed block diagram of a tokenization server in accordance with some non-limiting embodiments or aspects of the present disclosure.

FIG. 2 shows a detailed block diagram of a tokenization server 101 in accordance with some non-limiting embodiments or aspects of the present disclosure.

In some non-limiting embodiments or aspects, the tokenization server 101 may include a processor 201, an I/O interface 203, and a memory 205. The processor 201 may be used to perform various functions of the tokenization server 101 using data 207 and modules 209 stored in the memory 205. The I/O interface 203 may be used for interfacing the tokenization server 101 with a token requestor 103 for receiving a request for token 210 from the token requestor 103. Additionally, the tokenization server 101 may use the I/O interface 203 to connect to a user device 109 associated with the user 105 for accessing a plurality of files stored in the user device 109. In some non-limiting embodiments or aspects, the data 207 may be stored in the memory 205 of the tokenization server 101, as shown in FIG. 2. In some non-limiting embodiments or aspects, the data 207 may include, without limitation, a token 210, a token key 113, an authentication pin 211, and/or other data 213.

In some non-limiting embodiments or aspects, the data 207 may be stored in the memory 205 in the form of various data structures. Additionally, the data 207 may be organized using data models, such as relational or hierarchical data models. The other data 213 may store data, including temporary data and temporary files, generated by the modules 209 for performing the various functions of the tokenization server 101.

In some non-limiting embodiments or aspects, the token 210 may be a unique representation of characters used for masking the sensitive information of a payment card 107. In some non-limiting embodiments or aspects, the token 210 corresponding to the payment card 107 may be generated by the tokenization server 101 in real-time. In some non-limiting embodiments or aspects, the tokenization server 101 may dynamically generate the token 210 in response to a token request 111 received from the token requestor 103. Alternatively, in some non-limiting embodiments or aspects, the token 210 may be generated and preserved/stored in the tokenization server 101 until a predetermined time period and/or until a predetermined number of token requests are served. In some non-limiting embodiments or aspects, a new token 210 may be generated whenever a change, such as deletion and/or modification of at least one of the plurality of files stored on the user device 109, is detected.

In some non-limiting embodiments or aspects, the token key 113 may be an encrypted form of the token 210 generated by the tokenization server 101. In some non-limiting embodiments or aspects, the token key 113 may be dynamically generated by the tokenization server 101 using location information within a plurality of files stored in the user device 109. In some non-limiting embodiments or aspects, each character in the token key 113 may represent a location within the plurality of files, which has embedded a corresponding character of the token. For example, consider a token 210 such as "4AC7 F91G 8Y73 6W8I". In this case, the token key 113 corresponding to the above token 210 may be represented as an aggregation of the location addresses within the plurality of files, in which each of the characters of the token 210 is embedded.

In some non-limiting embodiments or aspects, the authentication pin 211 may be a unique identifier used for encrypting the token key 113 before transmitting the token key 113 to the token requestor 103. In some non-limiting embodiments or aspects, the authentication pin 211 may be set by the user 105 and received as a part of the token request 111 made by the token requestor 103. Subsequently, once the token key 113 is transmitted to the token requestor 103, the token requestor 103 may decrypt the encrypted token key 113 using the same authentication pin 211 to extract the token 210 corresponding to the payment card 107. Thus, by transforming the token 210 into an encrypted token key 113, the tokenization server 101 ensures that the tokenized card information is not accessible to unauthorized entities that do not have access to the authentication pin 211.

In some non-limiting embodiments or aspects, some or all of the data 207 stored in the memory 205 may be processed by the modules 209 of the tokenization server 101. The modules 209 may be stored within the memory 205. In an example, the modules 209 may be communicatively coupled to the processor 201 configured in the tokenization server 101. Alternatively, the modules 209 may also be present outside the memory 205, as shown in FIG. 2, and implemented as separate hardware modules. As used herein, the term modules 209 may refer to an Application Specific Integrated Circuit (ASIC), an electronic circuit, a processor (shared, dedicated, or group), and memory that execute one or more software or firmware programs, a combinational logic circuit, and/or other suitable components that provide the described functionality.

In some non-limiting embodiments or aspects, the modules 209 may include, for example, a receiving module 215, a token generation module 217, a token key generation module 219, and/or other modules 221. The other modules 221 may be used to perform various miscellaneous functionalities of the tokenization server 101. It will be appreciated that such aforementioned modules 209 may be represented as a single module or a combination of different modules.

In some non-limiting embodiments or aspects, the receiving module 215 may be configured for receiving a token request 111 from the token requestor 103 for providing a token 210 corresponding to the payment card 107 to the token requestor 103. Further, the receiving module 215 may also be configured to receive the plurality of files from the user device 109 associated with the user 105. In some non-limiting embodiments or aspects, the token generation module 217 may be configured for generating the token 210 corresponding to the payment card 107.

In some non-limiting embodiments or aspects, the token key generation module 219 may be configured for generating the token key 113 corresponding to the token. Initially, the token key generation module 219 may receive the plurality of files from the user device 109 for determining the location information to be used for generating the token key 113. As an example, the plurality of files may include, without limitation, image files, text files, audio/video files, and the like, which may be used for embedding a set of predetermined characters. In some non-limiting embodiments or aspects, the token generation key module 219 may receive at least a specified or determined number of files from the user device 109 for generating a secure token key 113 corresponding to the token. Subsequent to receiving the plurality of files from the user device 109, the token key generation module 219 may identify one or more locations in each of the plurality of files, in which the plurality of characters of the token 210 are embedded. As an example, if there are 16 characters in the token, then the token key generation module 219 may identify 16 files from the user device 109 and may identify a single location in each of the 16 files, which have embedded the characters of the token. For example, a first character of the token 210 may be replaced with a location address of a location in the first file, in which the first character of the token 210 is embedded. Subsequently, each character of the token 210 may be replaced by location addresses of corresponding characters embedded in the files for generating the token key 113 corresponding to the token.

Figure 3:
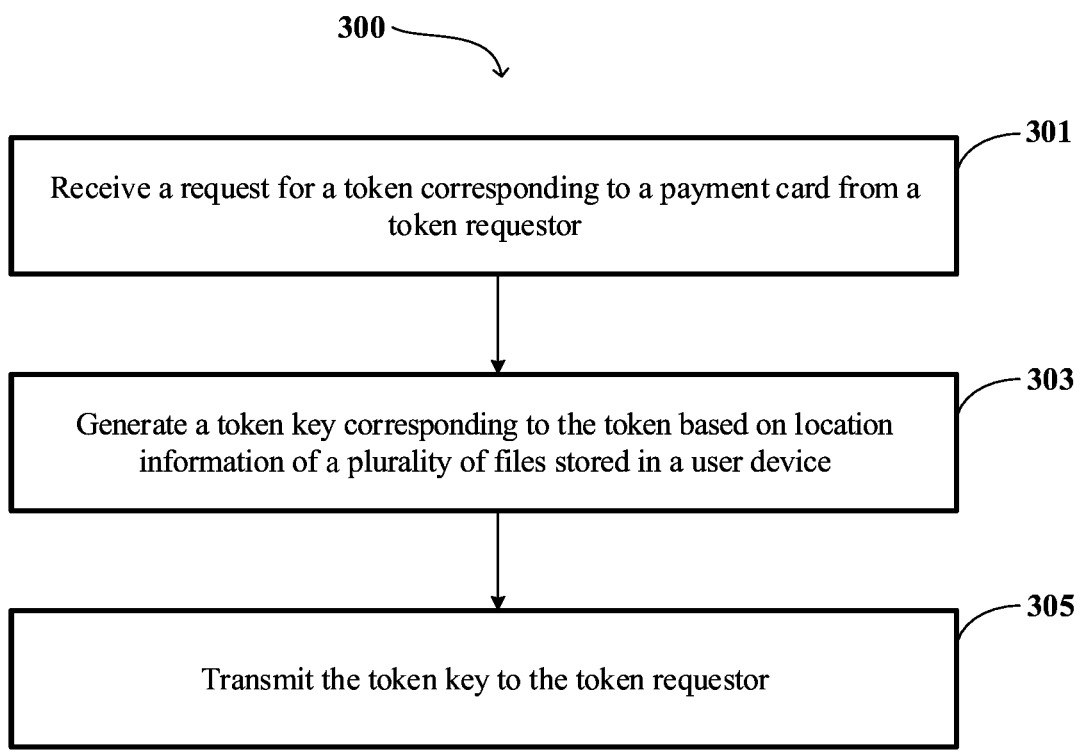
FIG. 3 shows a flowchart illustrating a method of generating and transmitting tokenized card information in accordance with some non-limiting embodiments or aspects of the present disclosure.

FIG. 3 shows a flowchart illustrating a method 300 of generating and transmitting tokenized card information in accordance with some non-limiting embodiments or aspects of the present disclosure. The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

In some non-limiting embodiments or aspects, and at block 301, the method 300 may include receiving, from a token requestor 103, a request for transmitting a token 210 corresponding to a payment card 107. As an example, the token 210 may be made up of a plurality of characters. In some non-limiting embodiments or aspects, the token requestor 103 may generate the token request 111 in response to receiving a transaction initiation request or an authentication request from a user 105 of the payment card 107. Further, as an example, the request may include, without limitation, information related to the user 105 of the payment card 107, information related to a user device 109 associated with the user 105, and an authentication pin 211.

At block 303, the method 300 may include generating, by a tokenization server 101, a token key 113 corresponding to the token 210 of the payment card 107. In some non-limiting embodiments or aspects, the tokenization server 101 may generate the token key 113 for the token 210 based on location information derived from a plurality of files stored in the user device 109. In some non-limiting embodiments or aspects, upon receiving the request from the token requestor 103, the tokenization server 101 may receive the plurality of files from the user device 109. Subsequently, the tokenization server 101 may identify one or more locations in the plurality of files, which have the plurality of characters of the token 210 embedded. Finally, the tokenization server 101 may generate the location information by associating the one or more identified locations with a corresponding plurality of characters of the token.

At block 305, the method 300 may include transmitting, to the token requestor 103, the token key 113 corresponding to the token. As discussed above, the token key 113 may comprise location information within the plurality of files in the user device 109, such that the location information includes a location embedded with a character of the plurality of characters of the token. In some non-limiting embodiments or aspects, the token key 113 may be encrypted using an authentication pin 211 before transmitting the token key 113 to the token requestor 103. Further, the token requestor 103 may decrypt the token key 113 using the authentication pin 211, for extracting the token 210 corresponding to the payment card 107. Thus, in some non-limiting embodiments or aspects, transmission and/or sharing of the token key 113 to the token requestor 103 is secured with the use of the authentication pin 211.

In some non-limiting embodiments or aspects, the tokenization server 101 may generate a new token key 113 for the token 210 at predetermined periodic intervals. As an example, the predetermined periodic interval may be 1 week, such that the tokenization server 101 is configured to generate a fresh token key 113 and/or replace an old token key 113 once a week. Alternatively, the tokenization server 101 may generate the new token key 113 whenever the tokenization server 101 detects a change in the location information corresponding to the plurality of files in the user device 109. By regularly changing and/or generating the new token key 113, the tokenization server 101 may maintain the integrity of the location information used for generating the token key 113.

In some non-limiting embodiments or aspects, the token 210 corresponding to the payment card 107 may be generated by the tokenization server 101 in real-time. In some non-limiting embodiments or aspects, the tokenization server 101 may generate the token 210 as soon as the request for providing the token 210 is received from the token requestor 103. In some non-limiting embodiments or aspects, the tokenization server 101 may generate the token key 113 at a particular instance and may store it for a predetermined time period.

In some non-limiting embodiments or aspects, the present disclosure provides a secure mechanism for storing the information of a tokenized card on a personal device of the user, rather than storing the information on a device or a memory located at the token requestor's end. This also ensures that the tokenized card information is not directly shared with the token requestor over the Internet. Consequently, the present disclosure enhances the security associated with generating, storing, and transmitting the tokenized card information to the token requestor.

Figure 4:
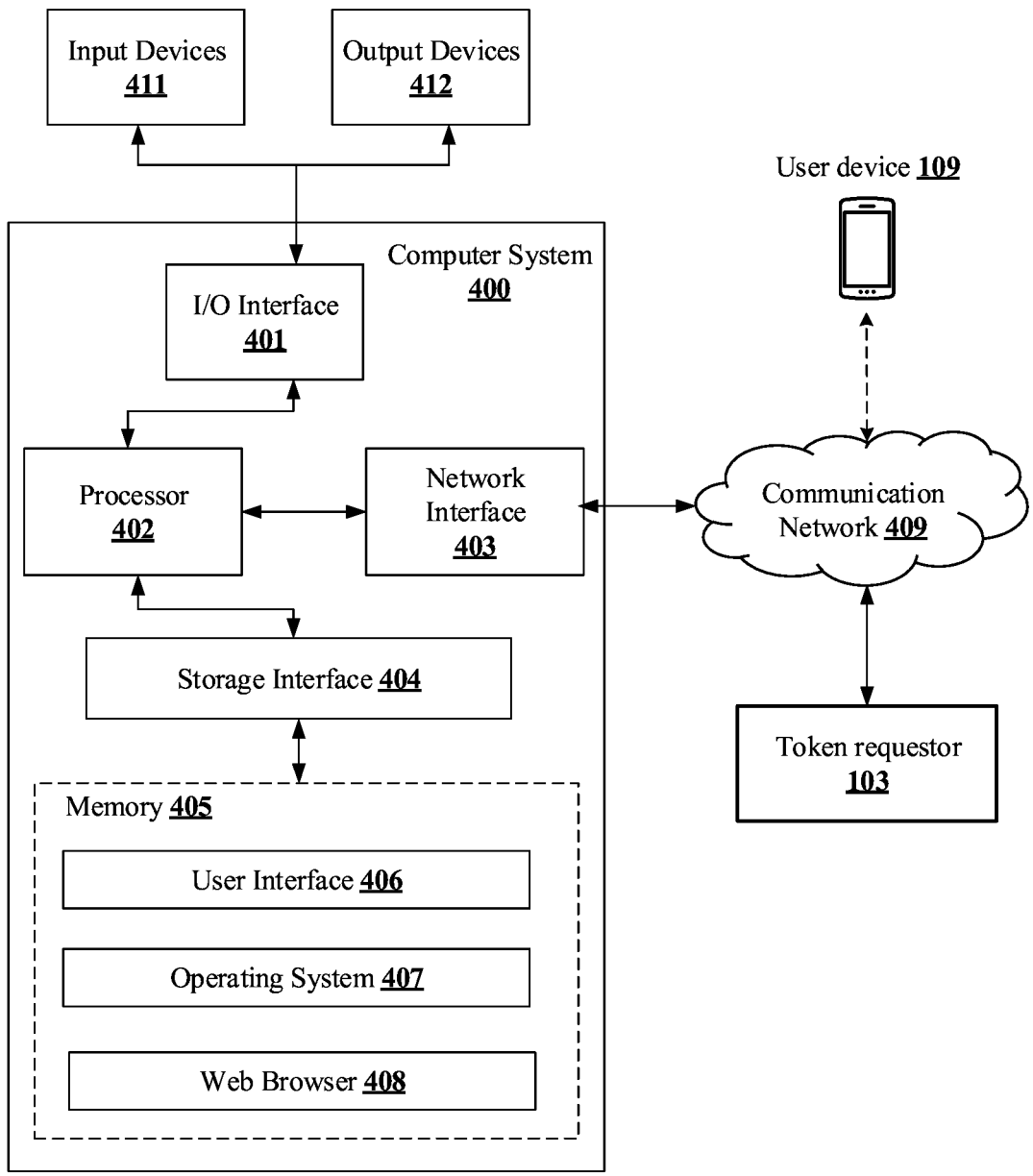
FIG. 4 shows a block diagram of an exemplary computer system for implementing embodiments consistent with the present disclosure.

FIG. 4 is a block diagram of an exemplary computer system for implementing embodiments consistent with the present disclosure. In some non-limiting embodiments or aspects, a computer system 400 may be a tokenization server 101 that is used for generating and transmitting tokenized card information to a token requestor 103. The computer system 400 may include a central processing unit ("CPU" or "processor") 402. The processor 402 may include at least one data processor for executing program components for executing user- or system-generated business processes. A user 105 may include a person, a customer, a person using a payment card 107, and/or a person using a user device 109, such as those included in this disclosure or such a device itself. The processor 402 may include specialized processing units, such as integrated system (bus) controllers, memory management control units, floating point units, graphics processing units, digital signal processing units, etc.

The processor 402 may be disposed in communication with input devices 411 and output devices 412 via an I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth®, cellular (e.g., Code-Division Multiple Access (CDMA), High-Speed Packet Access (HSPA+), Global System For Mobile Communications (GSM), Long-Term Evolution (LTE), WiMax®, or the like), etc.

Using the I/O interface 401, the computer system 400 may communicate with the input devices 411 and the output devices 412.

In some non-limiting embodiments or aspects, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may interface with a token requestor 103 for receiving a request for a token 210 corresponding to a payment card 107 and/or for transmitting a token key 113 corresponding to the token. Further, the communication network 409 may be used to connect to a user device 109 associated with the user 105 for receiving and/or accessing at least a plurality of files stored in the user device 109.

In some non-limiting embodiments or aspects, the communication network 409 can be implemented as one of the different types of networks, such as intranet or Local Area Network (LAN), Closed Area Network (CAN), and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some non-limiting embodiments or aspects, the processor 402 may be disposed in communication with a memory 405 (e.g., RAM, ROM, etc. not shown in FIG. 4) via a storage interface 404. The storage interface 404 may connect to the memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408, etc. In some non-limiting embodiments or aspects, the computer system 400 may store user/application data, such as the data, variables, records, etc. as described in this disclosure. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE® ANDROID®, BLACK-BERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some non-limiting embodiments or aspects, the computer system 400 may implement the web browser 408 stored program components. The web browser 408 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some non-limiting embodiments or aspects, the computer system 400 may implement a mail server stored program component. The mail server may be an Internet mail server such as Microsoft® Exchange®, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some non-limiting embodiments or aspects, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some non-limiting embodiments or aspects", and "one embodiment" mean "one or more (but not all) embodiments of the invention(s)" unless expressly specified otherwise.

A description of an embodiment with several components in communication with each other does not imply that all such components are required. On the contrary, a variety of optional components is described to illustrate the wide variety of possible embodiments of the disclosure.

The terms "including", "comprising", "having", and variations thereof mean "including but not limited to" unless expressly specified otherwise. The enumerated listing of items does not imply that any or all of the items are mutually exclusive unless expressly specified otherwise. The terms "a", "an", and "the" mean "one or more" unless expressly specified otherwise. A description of some non-limiting embodiments or aspects with several components in communication with each other does not imply that all such components are required. On the contrary, a variety of optional components is described to illustrate the wide variety of possible embodiments of the disclosure.

The illustrated operations of FIG. 3 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the disclosure, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
   receiving, with at least one processor and from a token requestor, a request for a token corresponding to a payment card, wherein the token comprises a plurality of characters;
   encrypting, with at least one processor, a token key using an authentication pin before transmitting the token key to the token requestor; and
   transmitting, with at least one processor and to the token requestor, the token key corresponding to the token, wherein the token key is decrypted by the token requestor, using the authentication pin, for extracting the token corresponding to the payment card, wherein the token key comprises location information within a plurality of files in a user device, and wherein the location information comprises a location embedded with a character of the plurality of characters of the token.

2. The computer-implemented method of claim 1, wherein, in response to receiving a transaction initiation request or an authentication request from a user, the method further comprises generating, by the token requestor, the request.

3. The computer-implemented method of claim 1, wherein the request comprises information related to at least one of the following: a user of the payment card, the user device associated with the user, an authentication pin, or any combination thereof.

4. The computer-implemented method of claim 1, wherein generating the token key for the token comprises:
   receiving, with at least one processor, the plurality of files from the user device;
   identifying, with at least one processor, one or more locations in the plurality of files with the plurality of characters of the token embedded; and
   generating, with at least one processor, the location information by associating the one or more identified locations with a corresponding plurality of characters of the token.

5. The computer-implemented method of claim 1, further comprising generating, with at least one processor, a new token key at predetermined periodic intervals or upon detecting a change in the location information.

6. The computer-implemented method of claim 1, wherein the token is previously generated and stored in a tokenization server or generated by a tokenization server in real-time.

7. A tokenization server comprising:
   at least one processor; and
   a memory, communicatively coupled to the at least one processor, wherein the memory stores processor-executable instructions, which, on execution, cause the processor to:
   receive, from a token requestor, a request for a token corresponding to a payment card, wherein the token comprises a plurality of characters;
   encrypt a token key using an authentication pin before transmitting the token key to the token requestor; and
   transmit, to the token requestor, the token key corresponding to the token, wherein the token key comprises location information within a plurality of files in a user device, and wherein the location information comprises a location embedded with a character of the plurality of characters of the token.

8. The tokenization server of claim 7, wherein the request is generated by the token requestor in response to receiving a transaction initiation request or an authentication request from a user.

9. The tokenization server of claim 7, wherein the request comprises information related to at least one of the following: a user of the payment card, the user device associated with the user, an authentication pin, or any combination thereof.

10. The tokenization server of claim 7, wherein the at least one processor generates the token key for the token by:
    receiving the plurality of files from the user device;
    identifying one or more locations in the plurality of files with the plurality of characters of the token embedded; and
    generating the location information by associating the one or more identified locations with corresponding plurality of characters of the token.

11. The tokenization server of claim 7, wherein the at least one processor generates a new token key at predetermined periodic intervals or upon detecting a change in the location information.

12. A non-transitory computer-readable medium including instructions stored thereon that, when processed by at least one processor, cause the at least one processor to perform operations comprising:

receiving, from a token requestor, a request for a token corresponding to a payment card, wherein the token comprises a plurality of characters;

encrypting a token key using an authentication pin before transmitting the token key to the token requestor; and transmitting, to the token requestor, the token key corresponding to the token, wherein the token key is decrypted by the token requestor, using the authentication pin, for extracting the token corresponding to the payment card, wherein the token key comprises location information within a plurality of files in a user device, and wherein the location information comprises a location embedded with a character of the plurality of characters of the token.

13. The medium of claim 12, wherein the request is generated by the token requestor in response to receiving a transaction initiation request or an authentication request from a user, wherein the request comprises information related to at least one of the following: a user of the payment card, the user device associated with the user, an authentication pin, or any combination thereof.

14. The medium of claim 12, wherein the instructions cause the at least one processor to generate the token key for the token by:

receiving the plurality of files from the user device;

identifying one or more locations in the plurality of files with the plurality of characters of the token embedded; and generating the location information by associating the one or more identified locations with corresponding plurality of characters of the token.

15. The medium of claim 12, wherein the instructions cause the at least one processor to generate a new token key at predetermined periodic intervals or upon detecting a change in the location information.

16. The medium of claim 12, wherein the token is previously generated and stored in a tokenization server or generated by a tokenization server in real-time.

* * * * *